Feb. 3. 1925.
W. C. LEONARD
DISK WHEEL
Filed Dec. 7, 1923
1,525,306
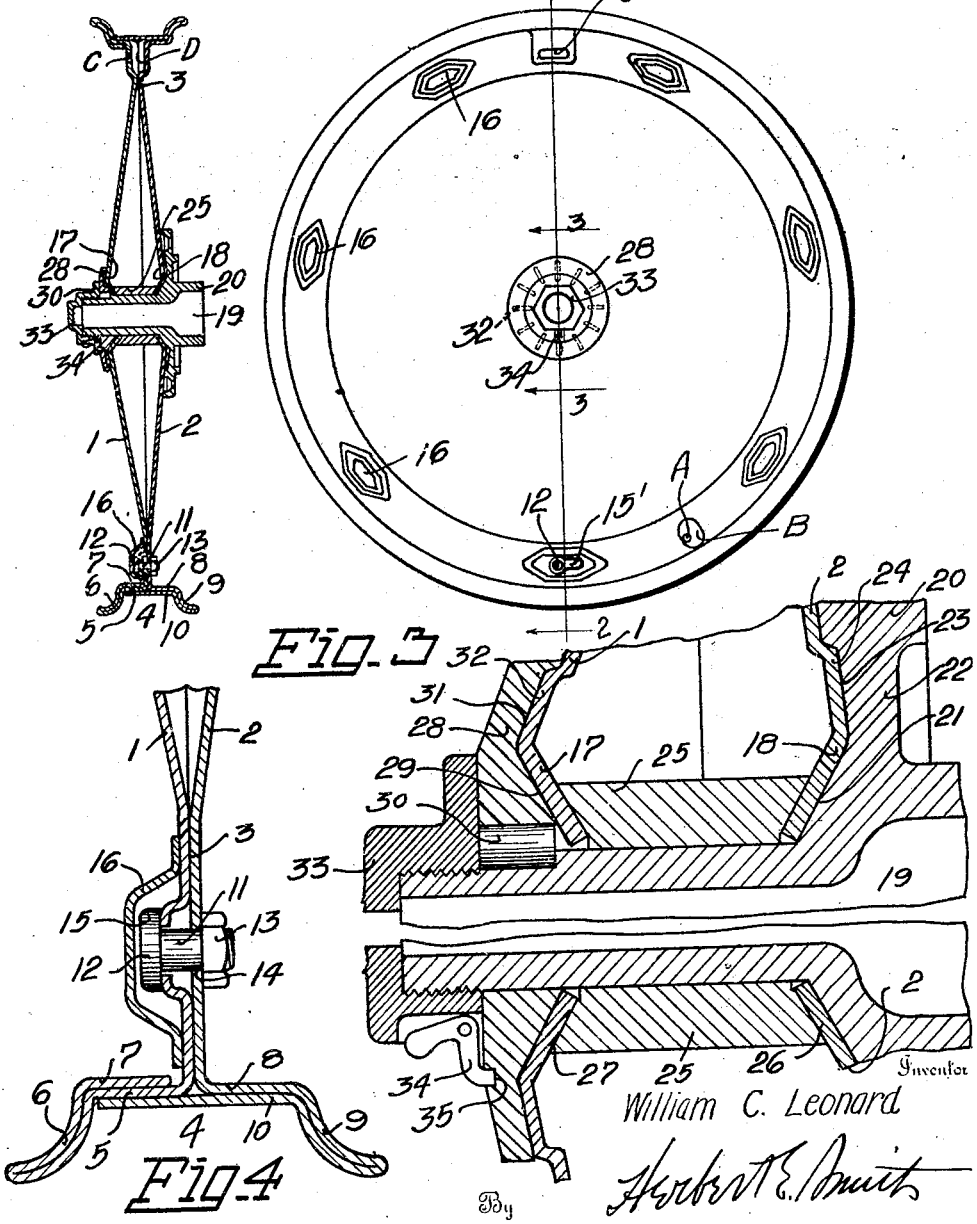

Patented Feb. 3, 1925.

1,525,306

UNITED STATES PATENT OFFICE.

WILLIAM C. LEONARD, OF LEWISTON, IDAHO, ASSIGNOR TO LEONARD ROLLER GEAR DRIVE THRESHER COMPANY, OF LEWISTON, IDAHO.

DISK WHEEL.

Application filed December 7, 1923. Serial No. 679,178.

*To all whom it may concern:*

Be it known that I, WILLIAM CLYDE LEONARD, a citizen of the United States, residing at Lewiston, in Nez Perce County and State of Idaho, have invented certain new and useful Improvements in Disk Wheels, of which the following is a specification.

The present invention relates to improvements in disk wheels of the type used in connection with automobiles, trucks, and other automotive vehicles. The invention involves the use of double disks of pressed steel which are combined and arranged at the rim and hub portions in such manner as to provide a strong and well braced and durable structure, which structure is composed of a practical minimum number of parts rendering its construction very simple but effective. In its assembly the parts of the wheel may with facility and convenience be firmly and securely fixed against displacement and the wheel structure placed under the required tension for durability and strength.

The invention consists in certain novel combinations and arrangements of parts at the hub and rim portions of the wheel as will hereinafter be more fully described and claimed.

In the accompanying drawings I have illustrated one complete example of the physical embodiment of my invention wherein the parts are combined and arranged in accordance with the best mode I have thus far devised for the practical application of the principles of my invention.

Figure 1 is a view in elevation at the outer side of the wheel, one of the bolt caps being removed to show a clamping bolt for the two sections of the wheel.

Figure 2 is a central vertical sectional view at line 2—2 of Fig. 1.

Figure 3 is an enlarged, transverse sectional view at line 3—3 of Fig. 1 showing the hub structure.

Figure 4 is an enlarged detail sectional view at the rim portion of the wheel showing also one of the clamp bolts for retaining the disks or sections of the wheel.

The disk wheel is made up of two sections 1 and 2, the former at the outer side of the wheel and the latter at the inner side, and these sections, which are preferably of pressed steel fashioned by suitable dies are dished or of concavo-convex formation as indicated in Fig. 2. Near the rim portion of the wheel these sections are brought together to form a flat annular contacting area designated as 3 to form a double-thick vertically disposed ring within the rim which latter is designated as a whole by the numeral 4. The rim is fashioned of integral parts of the two disks or sections 1 and 2 which are made to overlap and form an efficient supporting structure for the usual pneumatic tire or other type of tire.

In Figure 4 it will be seen that the disk section 1 at its periphery is provided with a lateral, annular rim-flange 5 which projects outwardly from the body of the section, and at 6 this flange is bent upon itself, with a return bend, to form the tire-retaining flange at the outer side of the wheel. The tire-retaining flange terminates in an angular flange 7 which lies close against the inner face of the lateral flange 5 with its inner edge adjacent to the double wall 3 of the wheel.

A complementary rim-formation is fashioned at the periphery of the disk 2, which is provided with a lateral rim-flange 8 projected in the opposite direction from flange 5. The flaring tire-flange 9 is formed by doubling and folding the metal and this flange terminates in the exterior annular flange 10 which extends across the rim to the complementary tire-flange 6.

These flanged parts forming the rim structure 4 provide an annular channel for the reception and retention of the standard types of tires, the structure being strong and well braced and capable of supporting the required loads.

The two sections of the disk wheel are interlocked and are relatively movable for assembly and for dismounting, and for this purpose a series of bolts 11 are spaced at regular intervals around the flat ring 3, each bolt extending transversely through the sections and provided with a head 12 and securing nut 13. One of the sections is provided with bolt holes 14 for the bolts, and another section is fashioned with outwardly projecting bosses 15 stamped from the metal and provided with keyhole slots 15' for the bolts. To protect the bolt heads and shield the slotted bosses caps 16 are secured over these parts as clearly seen in Figs. 1 and 4 and these caps form pockets around the heads and bosses to prevent entrance of dust or dirt to the slotted bosses. The two sections of the disk wheel may be placed in proper initial position by first alining the holes 14 and slots 15'; the bolts are then passed through the slots and holes and the nuts turned into comparatively loose engagement. Then the two sections are turned relatively in a circular or circumferential direction until they are properly adjusted whereupon the bolts are tightened for securely clamping the sections together.

This turning action may be accomplished by the use of a suitable eccentric tool which is applied to a socket or opening A in one of the sections and adapted to coact with an eccentric and larger opening B in another of the sections as indicated in Fig. 1. A valve stem opening is also indicated at C and a pocket D is located between the sections within the rim 4 to accommodate the pneumatic valve of the tire, as usual.

At the hub portion of the wheel a simple but very effective structure is provided for placing the sections of the disk wheel under tension and securely joining the sections with the hub members, as best seen in Figure 3. At the center of each of the sections 1 and 2 is provided an opening surrounded by complementary annular flanges 17 and 18 which form conical hub rings within which are located the transversely extending bearing sleeve 19 for the journal end of the wheel shaft or axle. At the inner side of the wheel this sleeve is fashioned with an enlarged head 20 having an exterior conical seat 21 for the conical hub ring 18, and the head is fashioned with an attaching flange 22 for connection with parts not shown herein. To rigidly secure the conical hub ring 18 to the conical seat 21 and flange 22 the latter is provided on its inner face with a series of radiating grooves 23 and the section 2 of the wheel is fashioned with a complementary series of crimps or ribs 24 stamped from the metal and fitting closely in the grooves 23 in order that the section 2 and the sleeve 19 may revolve together as a unit.

The bearing sleeve of the hub carries a hub barrel 25 having at its ends complementary conical seats 26 and 27 the former frictionally engaging the conical hub ring 18 to hold it to its seat 21. At the outer side of the wheel a hub flange 28 is fitted over the bearing sleeve 19 and fashioned with a central open boss 29 in the form of a cone and it will be apparent that the hub ring 17 is clamped between this boss and the seat 27 of the barrel 25. The bearing sleeve and outer hub flange are keyed together as at 30.

The outer hub flange is secured to the section 1 in the same manner that section 2 is fixed to the flange 22, radial grooves 31 being provided in the inner face of the flange and complementary exterior ribs or crimps 32 being stamped in the metal of section 1 as shown in Fig. 3.

The whole of the hub structure is retained by means of the hub cap or nut 33 threaded on the exteriorly threaded end of the bearing sleeve 19 at the outer side of the wheel, and the cap or nut is retained in locked position by means of a pawl 34 pivoted in the cap and adapted to selectively engage notches or indentations 35 in the outer face of the hub flange 28.

It will be apparent that by turning home the cap, the wheel is drawn to proper position and the hub rings 17 and 18 of the wheel sections are securely clamped between the barrel 25 and the hub flanges at opposite sides of the wheel. This action of the nut or cap also draws or pulls radially on the sections toward the hub structure, thus placing the sections under the required tension to form a stable, well braced and durable wheel structure.

Having thus fully described my invention, what I claim as new and desire to secure by Letters Patent is—

1. In a disk wheel the combination with two disk sections and clamping means therefor of an integral oppositely extending lateral flange at the periphery of each section, said flanges each having doubled portions forming outwardly flaring tire-retaining flanges, one of said tire-retaining flanges terminating in an inner lateral flange and the other tire-retaining flange terminating in an exterior lateral flange.

2. The combination in a disk wheel of a pair of relatively movable complementary sections having overlapping flanges forming a rim structure, a boss formed in one section having a keyhole slot and a complementary bolt hole in the other section, a clamping bolt having a head and nut, and a cap fixed over said head and boss.

3. In a disk wheel the combination with a pair of sections each having a central opening and oppositely disposed conical hub-rings, of a complementary hub-barrel between said rings, a bearing sleeve within the barrel and an inner hub flange on said sleeve, an outer hub flange keyed to the sleeve, and a hub-cap threaded on the sleeve.

4. In a disk wheel the combination with a pair of sections each having an open conical hub-ring and a hub barrel between said rings, of a bearing sleeve within the barrel and an inner hub-flange on said sleeve, an outer hub-flange, each said flanges having a series of radial grooves and complementary ribs in the two sections, and a hub cap threaded on the sleeve.

5. In a disk wheel the combination with a pair of sections having central openings and opposed conical hub-rings and a complementary hub barrel therebetween, of a bearing sleeve within the barrel and outer and inner hub flanges, means for securing each flange to a section, and means for clamping said flanges, hub rings and barrel on the bearing sleeve.

6. In a disk wheel the combination with a pair of sections having central openings and opposed conical hub rings, and a hub barrel having at its ends complementary conical seats for said rings, of a bearing sleeve within the barrel having an integral hub flange and grooves therein, a complementary hub flange keyed to said sleeve and provided with grooves, each said section having ribs complementary to said grooves, and a threaded cap on said bearing sleeve.

In testimony whereof I affix my signature.

WILLIAM C. LEONARD.